Dec. 1, 1964           J. DEMETER         3,158,899
APPARATUS FOR CONTINUOUSLY PRODUCING SHEETS
OF THERMOSETTING ARTIFICIAL RESINS
Filed Dec. 22, 1960
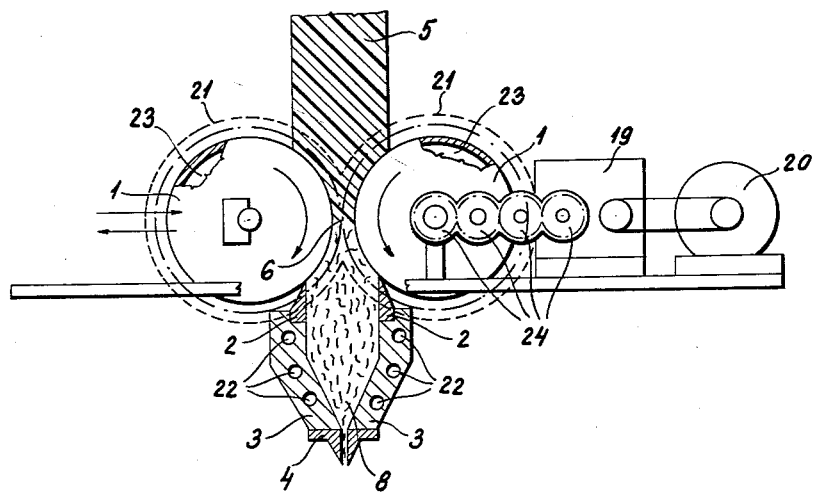
INVENTOR.
JÓZSEF DEMETER
BY Irvin S. Thompson
ATTORNEY United States Patent Office 3,158,899
Patented Dec. 1, 1964

3,158,899
APPARATUS FOR CONTINUOUSLY PRODUCING SHEETS OF THERMOSETTING ARTIFICIAL RESINS
József Demeter, Budapest, Hungary, assignor to Technoimpex Magyar Gepipari Kulkereskedelmi Vallalat, Budapest, Hungary
Filed Dec. 22, 1960, Ser. No. 77,638
1 Claim. (Cl. 18—12)

This invention is concerned with improvements in or relating to the production of sheets or foils from thermosetting artificial resins.

Various methods such as for example rolling, drawing through a wide mouthed extruder and blowing are already known for the production of sheets or foils of artificial resins without a solvent. These methods and the apparatus for carrying them out are however only suitable for use with thermoplastic artificial substances.

It is an object of the present invention to enable sheets and foils to be produced also from thermosetting artificial resins such as phenols, cresols, melamines and epoxy resins. Thermosetting artificial resins undergo a chemical change upon the action of heat, the extent of which change depends upon the length and temperature of the heat treatment. If a sheet or foil of a thermosetting resin, suitable for further working up is to be produced, the following requirements must be observed with regard to the unavoidable heat treatment.

(a) The thermosetting artificial resin can only be kept at the temperature necessary for the production of the sheet for a short time. After this period the resin still remains in the so-called A state, and is soluble and fusible.

(b) In the production of the sheets of thermosetting artificial resins and in the interest of chemical homogeneity of the sheet to be produced every particle of the material must be maintained at a uniform temperature for the same length of time.

These two requirements cannot be met by the known extrusion or blowing processes, since the resin particles flow through the extruder too slowly and at different times. The production of sheets by rolling is not practicable because the thermosetting resins adhere strongly to the roller surfaces and can only be separated therefrom by scraping it off.

These difficulties are avoided or reduced by the present invention according to which the artificial resin is fed between two heatable rollers and thus rendered molten, is then fed into a closed, heated chamber, from whence it passes through a slot of variable size to the atmosphere, the resultant sheet or foil, if desired before cooling being further reduced in thickness by stretching.

In one form of apparatus according to the invention for carrying out the above method there are provided two heatable, rotatably mounted rollers of a length equal to the width of the sheets to be produced, a material feeding device for feeding the artificial resin to the said rollers, said device having means for varying the temperature and speed of feed of artificial resin therein, and a collecting chamber having a controllable heating means and having scraper blades in contact with said rollers at its upper edge and a delivery slot of variable width at its lowest point.

In order that the invention may be well understood, some preferred embodiments thereof by way of example only will be further described with reference to the accompanying drawing in which the single figure shows diagrammatically in cross section a simple embodiment of apparatus according to the invention.

In the drawing only the main parts of the apparatus are shown. 1 indicates a pair of smooth melting rollers of a length equal to the width of the sheets to be produced.

A collecting channel 8 formed by channel walls 3 is disposed beneath the rollers and at its upper edges, which are of a length corresponding to the width of the sheets, doctor or scraper blades 2 are provided which are in contact with the rollers and are of the same length as the rollers. The channel walls 3 have a slot 4 at their lowest point, the length of which is again equal to the width of the sheet to be formed and the width of which is adjustable. The molten artificial resin can flow continuously through this slot in sheet form to the exterior.

Artificial resin 5 is delivered to the two heatable and rotatable rollers 1. The temperature of the rollers can be controlled according to the particular artificial resin being worked by means of heating cavity 23. Means are also provided for varying the speed of rotation, direction of rotation and the spacing apart of the rollers 1 comprising speed changing device 19, driving motor 20, gear drive 21 and transmission gears 24.

Artificial resin in cold state or at any desired temperature is fed to the rollers 1 in the form of powder granules, blocks or in molten form. By means of a feed device the artificial resin 5 can be urged forwards towards the rollers 1 at a desired speed.

Due to the heat of the rollers 1 the artificial resin urged into contact with them is fused and remains adhering to the roller surfaces so that the fused layer is continuously fed through the gap 6 into the interior of channel 8 when the rollers rotate in the direction shown. The layer of fused material adhering to the rollers is stripped off by the doctor blades 2. The artificial resin removed from the rollers collects in the heated channel 8 and when the channel is full flows through the slot to atmosphere under the pressure of the continuously fed material passing into the channel. The sheets of artificial resin passing through slot 4 at uniform speed can then be stretched into foil of a required thickness.

The thickness of the sheet of artificial resin emerging through the slot 4 can be adjusted by alteration of the width of the slot 4. For controlling the speed of output of the sheet the following possibilities are available. Any of the following may be varied.

(a) The speed of feed of the resin 5.
(b) The temperature of rollers 1 and/or of channel 3.
(c) The initial temperature of the resin 5.
(d) The width of the gap 6 between the rollers 1.
(e) The speed of rotation of the rollers 1.

In order to enable the homogeneity of the artificial resin sheet emerging from the slot 4 to be increased the rollers 1 can be driven at different speeds, and if desired a filter and a heatable torpedo can be disposed in the channel walls 3. Channel walls 3 may have heating or heat-regulating channels 22.

If desired scraper blades, which are mounted for reciprocal longitudinal movement with respect to the channel, can be mounted therein so as to scrape material from the channel walls in the channel 8 and thus prevent an accumulation of material therein.

What I claim is:

Apparatus for continuously producing sheets of thermosetting artificial resins comprising two heatable rotatably mounted rollers having smooth surfaces and at least a length equal to the width of the sheet to be formed, said rollers being disposed opposite each other in spaced relationship to define an opening therebetween, driving means operatively connected to said rollers for rotating said rollers and for varying the speed thereof, said rollers engaging solid thermosetting material therebetween as it is being fed into said opening so that said rollers fuse the thermosetting material, heatable channel means disposed beneath said rollers to receive the fused thermosetting material fused by said rollers and to maintain the thermosetting material in a fused state, scraper blades mounted on said channel means and engaging said rollers to scrape fused thermosetting material therefrom into said channel means, and die means disposed at the bottom of said channel means, said die means having a slot of variable width therein equal to said length through which the fused thermosetting material passes from said channel means to form a sheet of thermosetting material having a thickness and a length determined by said slot.

References Cited in the file of this patent

UNITED STATES PATENTS

| | | |
|---|---|---|
| 1,167,036 | Witham et al. | Jan. 4, 1916 |
| 2,369,506 | Weibel | Feb. 13, 1945 |
| 2,534,629 | Schultze | Dec. 19, 1950 |
| 2,740,986 | Lipscomb et al. | Apr. 10, 1956 |
| 2,749,571 | Pasquetti | June 12, 1956 |
| 2,758,336 | Franssen | Aug. 14, 1956 |
| 2,771,637 | Silvasy et al. | Nov. 27, 1956 |
| 2,807,047 | Olson et al. | Sept. 24, 1957 |
| 2,819,493 | Hawtin et al. | Jan. 14, 1958 |
| 2,922,194 | Lampard et al. | Jan. 26, 1960 |
| 3,006,225 | Mamas | Oct. 31, 1961 |
| 3,007,207 | Salhofer | Nov. 7, 1961 |
| 3,017,666 | Fontien et al. | Jan. 23, 1962 |
| 3,019,475 | Smith | Feb. 6, 1962 |

FOREIGN PATENTS

| | | |
|---|---|---|
| 902,022 | France | Aug. 16, 1945 |